Oct. 2, 1951        C. HOLLERITH        2,569,670
SELF-ENERGIZED BRAKE SYSTEM
Filed July 9, 1947        3 Sheets-Sheet 2
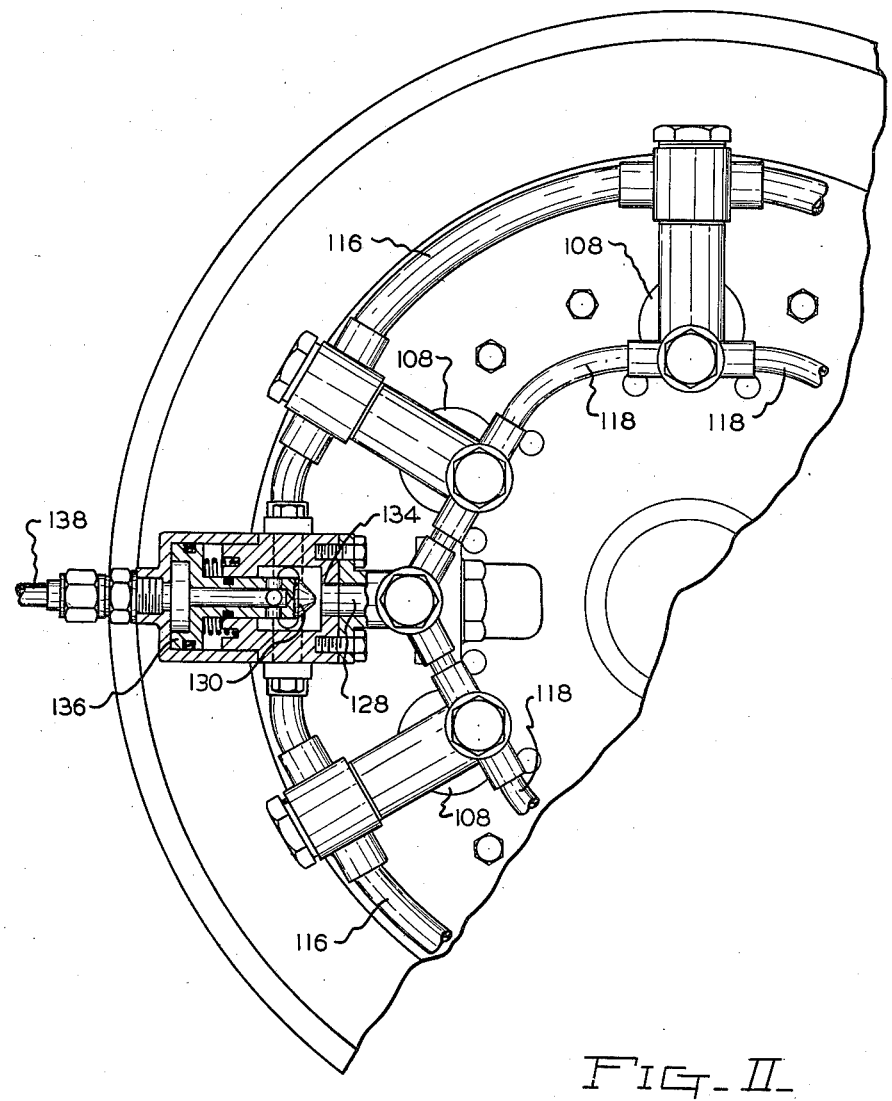
FIG_II
Inventor
CHARLES HOLLERITH
By Beaman & Patch
Attorneys

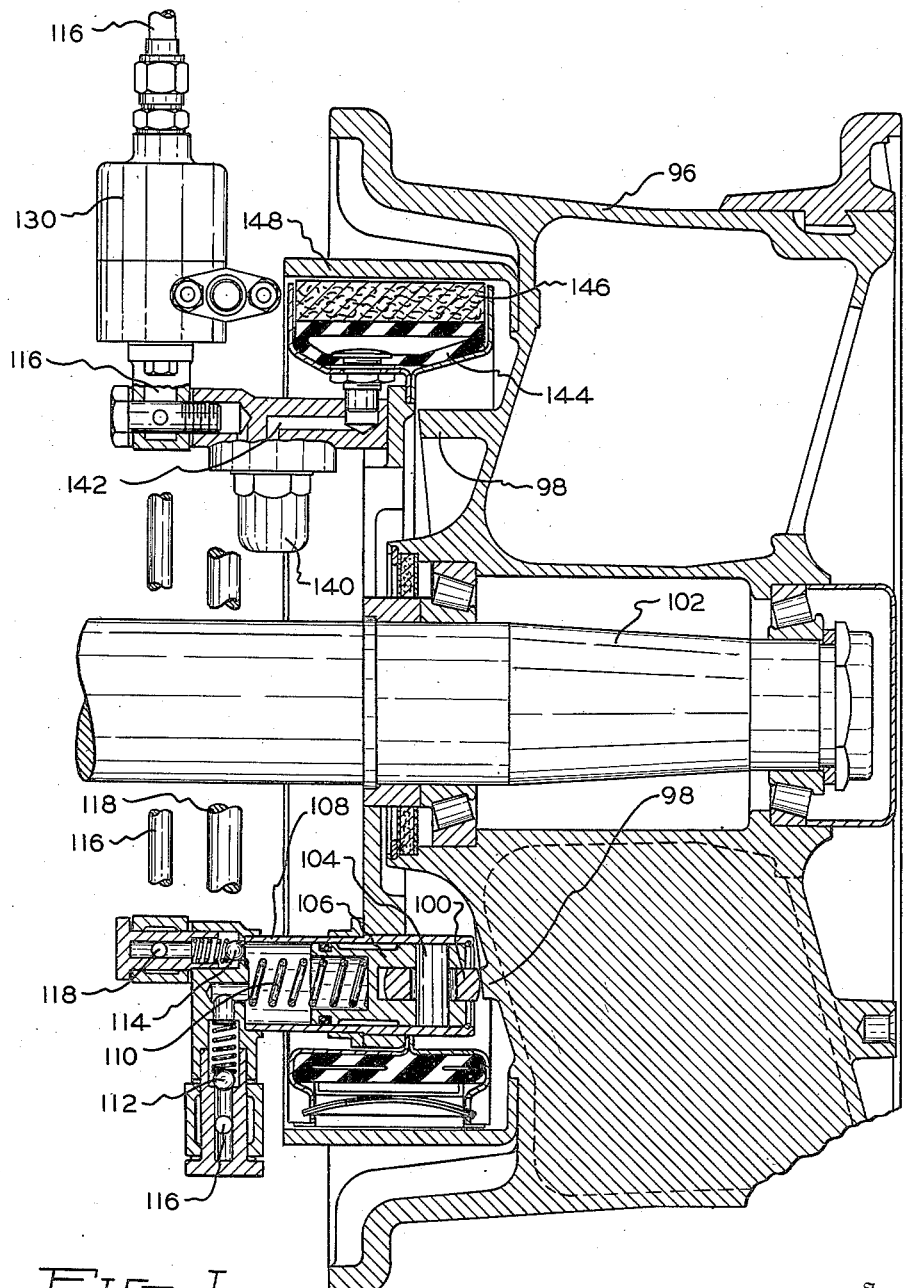

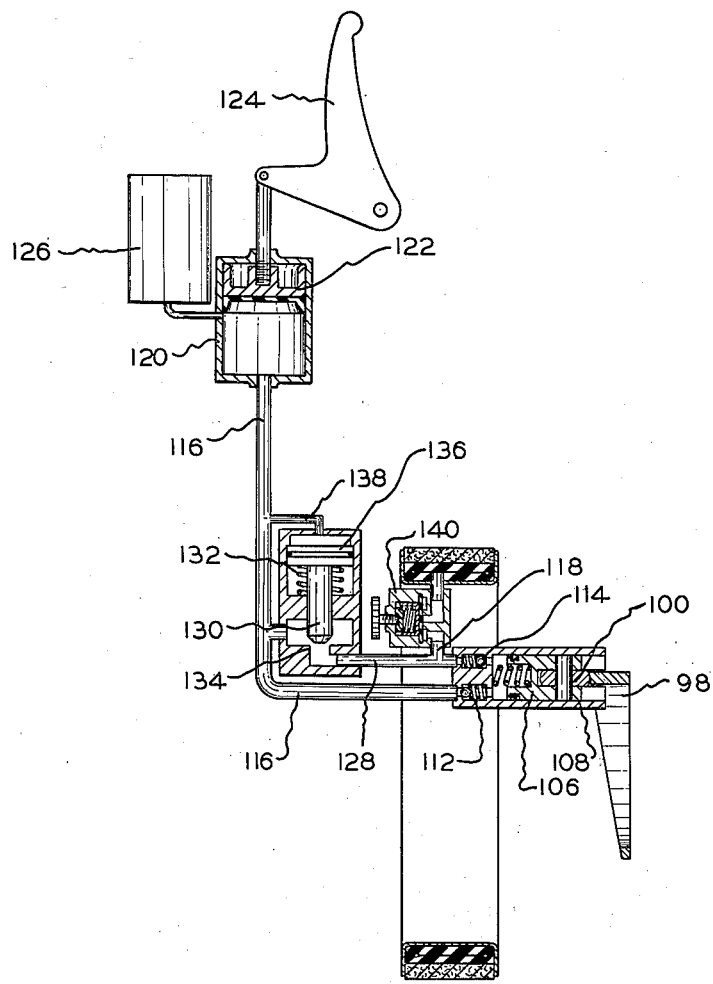
FIG. III

Patented Oct. 2, 1951

2,569,670

UNITED STATES PATENT OFFICE 2,569,670

SELF-ENERGIZED BRAKE SYSTEM

Charles Hollerith, Jackson, Mich., assignor, by mesne assignments, to The B. F. Goodrich Company, Akron, Ohio, a corporation of New York Application July 9, 1947, Serial No. 759,837

1 Claim. (Cl. 188—152)

The present invention relates to self-energized brake systems especially adapted to aircraft.

Conventional hydraulic brake system being used at the present upon aircraft, particularly upon the larger commercial and military types have many inherent disadvantages. Remote location of control and fluid pressure supply stations results in objectionable time lag between operation of controls and application of the brakes. High pressure pumps and accumulators are of necessity remotely located in the fuselage of the aircraft. The remote location of the aforesaid stations obviously results in a complicated plumbing network extremely vulnerable to rupture in military aircraft and objectionable in commercial aircraft from the standpoint of cost of installation, maintenance and weight factor.

According to the present invention it is proposed to overcome to a considerable extent a majority of the aforesaid disadvantages by a self-energized brake system directly associated with the landing wheels and remotely controlled mechanically, electrically or hydraulically.

Thus one of the objects of the invention is to provide an improved brake system for aircraft in which the rotational forces of the landing wheels are utilized to apply the brakes.

Another object is to provide a self-energized brake system for a driven wheel embodying a closed hydraulic circuit directly associated with the wheel.

Another object is to provide an improved hydraulic brake system having a pump actuated by the wheel being braked and remotely controlled.

A further object is to provide a wheel energized hydraulic brake system embodying a clutch controlled pump.

These and other objects and advantages of the invention will more fully appear from the following specification and attached claim.

In the drawings,

Fig. I is a vertical cross-sectional view through a wheel and brake assembly in accordance with the invention;

Fig. II is a fragmentary end view of the hydraulic arrangement of Fig. I, and

Fig. III is a diagrammatic layout of the hydraulic system of the construction of Figs. II and III.

Referring to the drawings, the wheel 96 is provided with a continuous cam 98 with which a roller follower 100 continuously engages as the wheel 96 rotates upon its axle 102. The follower 100 rotates on an anti-friction bearing upon the shaft 104 mounted in the piston 106 operating in the cylinder 108. A suitable spline (not shown) allows the piston to reciprocate in the cylinder 108 but prevents rotation. The spring 110 holds the follower 100 in contact with the cam 98. Conventional check valves 112 and 114 control the flow of fluid to and from the cylinder 108 through the inlet conduit 116 and the outlet conduit 118. The inlet conduit 116 connects with a large capacity master cylinder 120 with an operating piston 122 actuated by the foot pedal 124. A reservoir 126 keeps the system filled in a well known manner.

A by-pass conduit 128 extends between the conduit 116 and 118 and it is controlled by the shuttle valve 130 held open by the spring 132 and urged to its seat 134 by fluid pressure directed against the piston 136 through the conduit 138 connecting with the conduit 116.

In Fig. III, the principle of the operation of the invention is diagrammatically illustrated with a single follower 100 engaging with the cam 98. In Fig. II it will be noted that a plurality of cylinders 108 are provided in parallel relationship to each other so that the combined pumping action of the pistons 106 flows from the outlet conduit 118, through the brake adjustment valve 140, through the conduit 142 and into the expander tube 144 to urge the brake block 146 against the brake drum 148. Thus it will be understood that the reciprocation of the pistons 106 as the cam 98 rotates with the wheel 96 will boost the pressure of the fluid being displaced by the piston 122. Being of large capacity the pressure developed by the piston 122 through the pedal 124 will be substantially less than required for maximum braking. However, augmented by the boosting action of the piston 106 the expander tube 144 will be quickly inflated with high pressure fluid to apply the brake with the brake reaction or "feel" on the pedal 124 being controlled by the valve 130 acted upon by the high pressure fluid in the conduit 128. As the wheel 96 is decelerated by the brake action and is finally stopped it will be understood that the pressure developed by the pedal 124 will be adequate for parking and minimum braking operation.

Having thus described my invention, what I claim as new and desire to cover by Letters Patent is:

In a brake system for aircraft landing wheels, a wheel and brake assembly having a pump actuator directly associated with the wheel and energized when the wheel is rotated, a pump having an inlet and a discharge located directly adjacent said wheel and brake assembly, an operative connection between said pump and actuator, conduit structure located adjacent said assembly and hydraulically connecting said inlet and discharge to define a by-pass for fluid pressure, valve mechanism including a normally open fluid pressure actuated valve located in said by-pass, a hydraulic connection between said brake and discharge, a supply of hydraulic fluid remotely located with reference to said assembly and hydraulically connected to said inlet, said valve mechanism including means defining a chamber in which fluid under pressure is directed to actuate said valve to restrict said by-pass to direct fluid pressure from said pump to said brake, manual control means, remotely located with reference to said assembly, including a displaceable wall hydraulically connected to said chamber and to said brake to simultaneously move said valve toward a restricting position in said by-pass and to initiate the application of hydraulic fluid in said brake, whereby the capacity of said pump to furnish hydraulic fluid under pressure to said brake from said supply is a function of the rate of rotation of said wheel and the regulation of said valve by said remotely located manual control means, and structure defining a fluid return between said brake and said supply with said valve in its normally open position.

CHARLES HOLLERITH.

REFERENCES CITED

The following references are of record in the file of this patent:

UNITED STATES PATENTS

| Number | Name | Date |
|---|---|---|
| 1,207,801 | Schmidt | Dec. 12, 1916 |
| 1,610,755 | Decker | Dec. 14, 1926 |
| 1,749,495 | MacPherson | Mar. 4, 1930 |
| 2,004,078 | McDougall | June 4, 1935 |
| 2,206,976 | Rossmann | July 9, 1940 |
| 2,396,897 | Stelzer | Mar. 19, 1946 |